Nov. 9, 1965    M. MENHART    3,216,024
BINDING DEVICE FOR USE WITH FABRICS AND THE LIKE
Filed Aug. 2, 1963    3 Sheets-Sheet 1
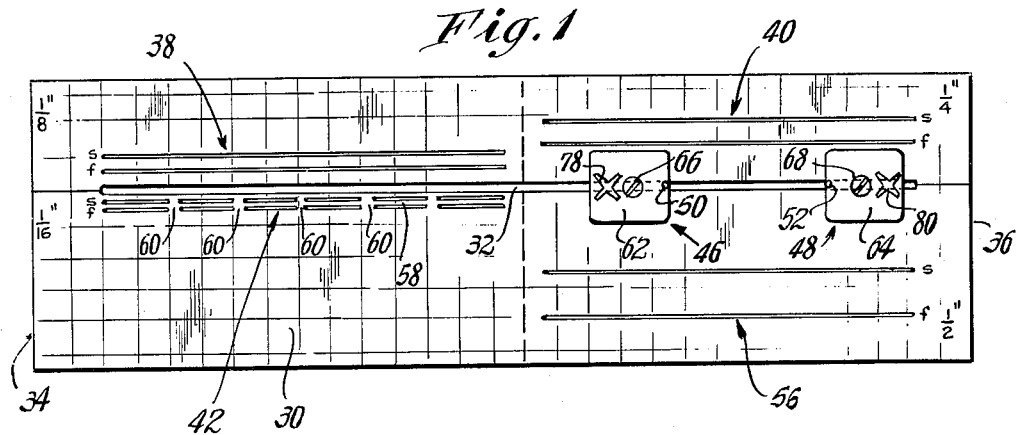
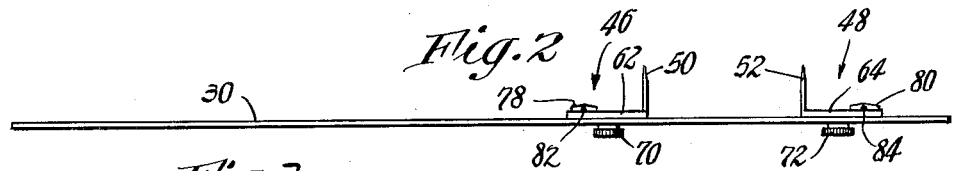
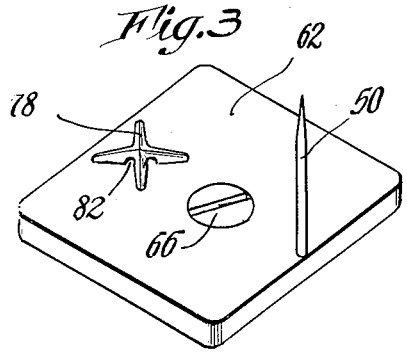
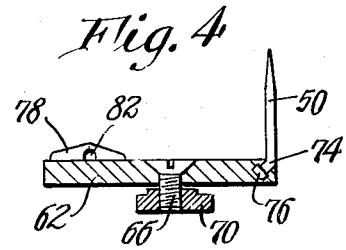
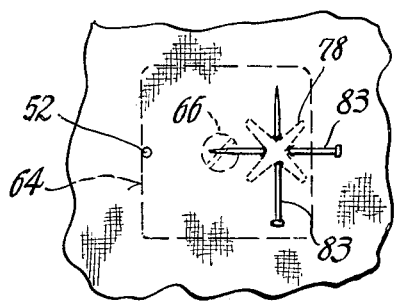
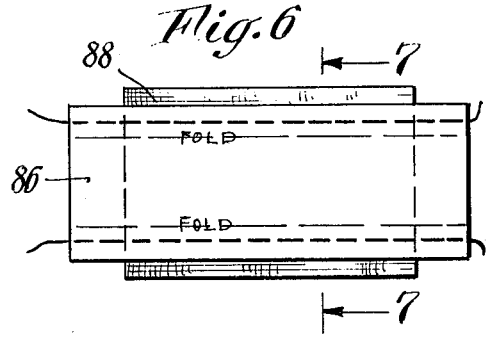
INVENTOR.
Muriel Menhart
BY
AGENT Nov. 9, 1965  M. MENHART  3,216,024
BINDING DEVICE FOR USE WITH FABRICS AND THE LIKE
Filed Aug. 2, 1963  3 Sheets-Sheet 2
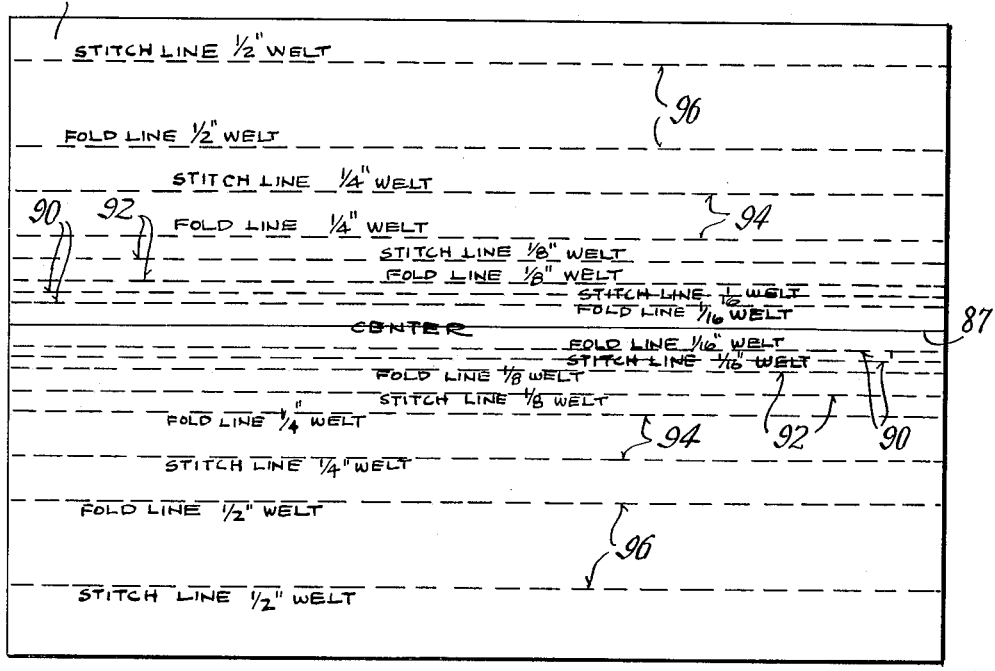
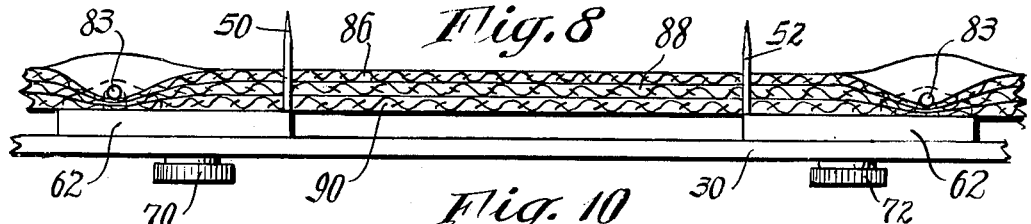
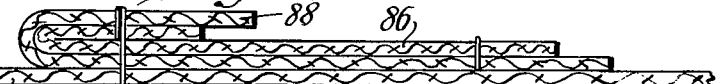
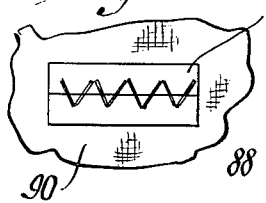
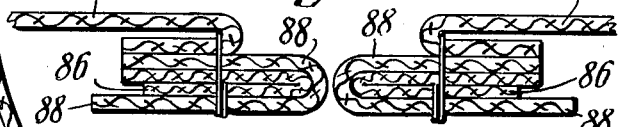
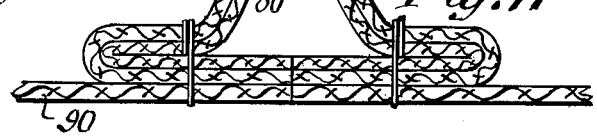
INVENTOR.
Muriel Menhart
BY
AGENT

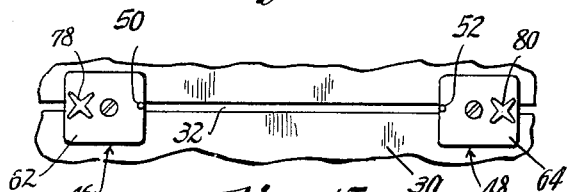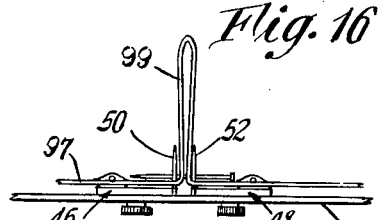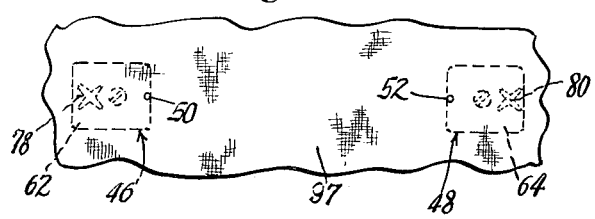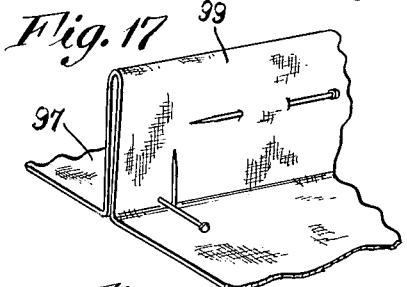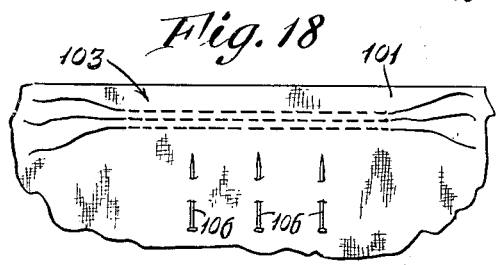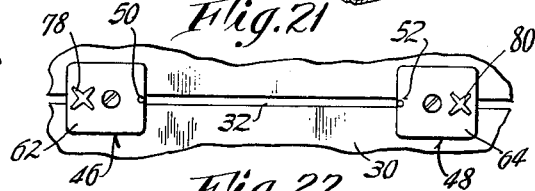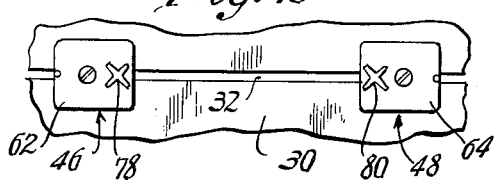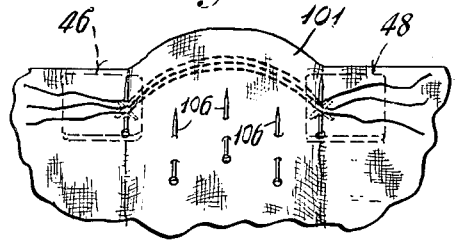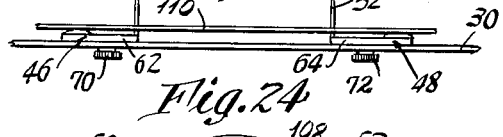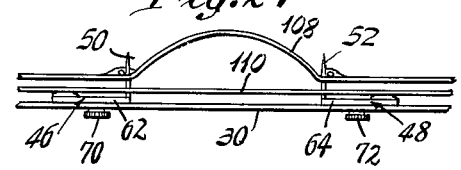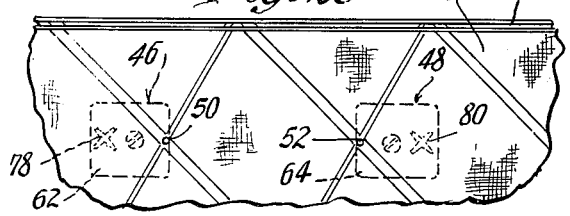

United States Patent Office 3,216,024
Patented Nov. 9, 1965

3,216,024
BINDING DEVICE FOR USE WITH FABRICS
AND THE LIKE
Muriel Menhart, 220 Doreen Drive, P.O. Box 85,
Fairfield, Conn.
Filed Aug. 2, 1963, Ser. No. 299,528
6 Claims. (Cl. 2—274)

This invention relates to the sewing arts, especially binding and working of garments, fabrics and the like.

A feature of the invention resides in the provision of an improved binding means which has stiffness, lines of weakness and an adhesive coating whereby it may be readily, quickly attached to a fabric strip to form an easily foldable binding assemblage that is especially convenient for use in the making of bound buttonholes, bound pocket openings and the like.

Other features and advantages will hereinafter appear.

In the drawings accompanying this specification, similar characters of reference are used to designate like components throughout the several views, in which:

FIG. 1 is a top plan view of the improved guide and locator means as provided by the invention.

FIG. 2 is a front edge or elevational view of the guide and locator means of FIG. 1.

FIG. 3 is a perspective view of one of the slide members of the guide and locator means.

FIG. 4 is a vertical sectional view of the slide member of FIG. 3.

FIG. 5 is a top plan view of a piece of novel binding or tape as provided by the invention.

FIG. 6 is a top plan view of the tape of FIG. 5 attached to a fabric strip and constituting a binding assemblage.

FIG. 7 is a transverse sectional view, greatly enlarged, taken on the line 7—7 of FIG. 6.

FIG. 8 is a view like that of FIG. 7 and further showing the locator device as well as a portion of the garment on which the binding assemblage is positioned.

FIG. 9 is a fragmentary plan view of the binding, garment and locator device, illustrating the securement of these in assembled relation.

FIG. 10 is a sectional view, greatly enlarged, through the garment and binding, illustrating a preliminary step in the forming of a bound buttonhole.

FIG. 11 is a sectional view like that of FIG. 10 but illustrating a later step in the formation of a bound buttonhole.

FIG. 12 is a view like that of FIGS. 10 and 11, illustrating a still later step in the formation of the bound buttonhole.

FIG. 13 is a fragmentary plan view of the garment showing the completed bound buttonhole.

FIG. 14 is a fragmentary top plan view of the guide and locator device, showing a setting of the slide members for carrying out a pleating or tucking operation.

FIG. 15 is a fragmentary top plan view of a piece of fabric having applied to it the locator device of FIG. 14.

FIG. 16 is a fragmentary view (enlarged) partly in section and partly in elevation, showing the fabric and locator device after an operational step, whereby the pleat has been formed.

FIG. 17 is a fragmentary perspective view of the pleated fabric, illustrating the fastening of the pleat.

FIG. 18 is a fragmentary plan view of an edge portion of a fabric having machine basting stitches, preparatory to effecting a gathering operation.

FIG. 19 is a fragmentary plan view of the guide and locator device arranged for use with the machine basted fabric of FIG. 18.

FIG. 20 is a perspective view showing the basted fabric of FIG. 18 positioned on the locator device of FIG. 19 in preparation for pulling the basting threads and working the gather into the material.

FIG. 21 is a fragmentary top plan view of the guide and locator device arranged for the purpose of facilitating the application of elastic tape to a piece of fabric.

FIG. 22 is a fragmentary top plan view of the piece of fabric with the locator device applied thereto.

FIG. 23 is an enlarged view partly in section and partly in side elevation, illustrating an elastic tape applied to the locator device.

FIG. 24 is a view similar to that of FIG. 23 and further illustrating the application of the fabric to the assemblage of elastic tape and locator device.

FIG. 25 is a fragmentary top plan view of pieces of fabric having a plaid or rectangular design, illustrating the application of the locator device to the pieces for the purpose of matching these to each other.

FIGS. 1–4 illustrate the novel combination guide and locator means provided by the present invention. This means comprises a thin guide plate 30 of suitable rigid material such as plastic, metal or the like, said plate having a centrally located slot 32 extending substantially between and to one pair of opposite edges 34, 36 of the plate. As provided by the invention, the plate 30 has two separate pairs of parallel and coextensive slots 38, 40 disposed at different locations along one side of the central slot 32, one of said pairs of slots (as for example the pair 38) extending substantially from one edge 34 to a central portion of the plate and the other of said pairs of slots (the pair 40) extending substantially from said central portion of the plate to the other edge 36 thereof. The plate 30 also has a third pair of parallel, coextensive slots 42 disposed along the other side of the central slot 32, and the slots of all of said pairs are parallel to the central slot 32 and are adapted to receive a pencil point and to guide the same. The said slots of the pairs have different spacings and are located different distances from the first mentioned or central slot 32 whereby parallel pencil lines of different spacing may be drawn on a piece of tape material located under the plate. Such parallel pencil lines may indicate differently spaced fold lines and stitch lines, as will be later explained in detail.

The guide and locator means of FIGS. 1–4 further comprises a pair of slide members 46, 48 passing through the central slot 32 and being positionable therealong at a large number of different locations, said members having locator prongs 50, 52 respectively which are adapted to pass through a garment or piece of fabric and also through a binding piece superposed thereon to indicate various things, as for instance the location of a cut to be made. The prongs or pins 50, 52 may for example be passed through an elastic tape, or a binding assemblage or merely a single piece of fabric for various purposes other than the making of bound buttonholes, bound pocket openings and the like, as will be hereinafter more fully brought out, although they serve an important purpose in buttonhole and pocket making.

Further, in accordance with the invention, the guide and locator device of FIGS. 1–4 additionally comprises a fourth pair of parallel coextensive slots 56 having different spacings, disposed along the said other side of and parallel to the first-mentioned or central slot 32, said third and fourth pairs of slots 42, 56 being disposed respectively broadside to the pairs 38, 40 and being spaced differently therefrom. The said fourth pair of slots 56 is also adapted to receive a pencil point to enable parallel pencil lines of yet another spacing to be drawn on a piece of tape or other material which may be disposed under the plate 30.

It will be noted that the slots of the third pair 42 are very closely spaced, whereby the intervening strip portion 58 is quite narrow and slim. For the purpose of reinforcing such intermediate strip portion 58, short connecting webs 60 may be provided, extending between the strip 58 and the remainder of the plate 30, as shown in FIG. 1.

The slide members 46, 48 may comprise flat bases 62, 64 respectively, as well as manually operable clamp devices including screws 66, 68 extending downward from the undersides of the bases and passing through the central slot 32 of the plate 30. Such arrangement controls the direction of movement of the slide members 46, 48. At their lower ends the screws 66, 68 have knurled clamping nuts 70, 72 respectively. Accordingly, the slide members 46, 48 may be shifted along the central slot 32 to occupy various positions thereon when the nuts 70, 72 are lose. By tightening the nuts 70, 72 the slide members are fixed in any of various desired positions.

As seen in FIG. 4, the prongs or pins 50, 52 have bent anchorage portions, such as the portion 74, and have heads (as the head 76) which are embedded in the base members to support the pins in the desired upright positions.

Further, in accordance with the invention, the base members 62, 64 of the sliders include low upward projections 78, 80 respectively, said projections having through openings disposed substantially wholly above the top surface of the members and adapted to receive two straight pins inserted at an angle to each other whereby a piece of fabric which is superposed on the sliders may be pinned thereto. This is shown in FIG. 9.

As seen in FIG. 4, the low upward projection 78 has a through opening 82, said projection having the shape of a cross and the through opening being at the center of the projection so as to be accessible at each of the four inner corners of the cross. The securement of a garment to the slider, and consequently to the locator device comprising the plate 30, may be done by passing two pins 83 at right angles to each other through the superposed garment or piece of fabric and through the opening 82, as in FIG. 9. The base members 62, 64 are advantageously molded of rigid plastic substance or any other suitable material, as will be understood.

In accordance with the invention there is provided a novel binding means for use on a garment or the like. The said binding means may be produced by using the guide and locator device described above in connection with FIGS. 1-4, or it may be produced by other suitable fabricating procedures. FIG. 5 of the drawings illustrates the binding means per se. As shown here, the binding may comprise a rectangular piece of tape, closely woven buckram or other relatively stiff woven or non-woven fabric-like material having a stiffness greater than that of ordinary unstarched fabric such as an unstarched linen or cotton handkerchief. As an example, the piece of tape 86 shown in FIG. 5 may be of a fibrous non-woven somewhat stiff cloth or fabric material having on one side a heat sensitive adhesive coating by which it can be adhered or ironed onto another piece of goods or fabric. Adhesive-coated, somewhat stiff "iron-on" material of the above type is currently produced under the registered tradename "Pelonite."

By the present invention the piece 86 of Pelonite or other like material is provided wtih a plurality of parallel line markings thereon, said markings including a single centrally located center line marking 87 as well as a plurality of different sets of line markings, each set comprising two pairs of line markings, the pairs being indicated at 90, 92, 94 and 96 and the pairs with like numbers being located on opposite sides of the center line marking 87. The spacings of the pairs are uniform, and the pairs of like numbers are equi-spaced from the central line marking on the opposite sides thereof. The spacings of all of the pairs (90, 92, 94 and 96) at any one side of the center line marking differ from each other and the distances thereof from the center line marking 87 are also different. The binding 86 is also provided with indicia, in accordance with the invention, indicating which lines are stitch lines and which lines are fold lines, and also indicating welt size. For example, as seen in FIG. 5, the two outermost lines are stitch lines for a one half inch welt. The next inner lines are fold lines for the ½ inch welt. Adjoining and inside of the fold lines for the ½ inch welt are stitch lines for a ¼ inch welt, followed by fold lines for the ¼ inch welt, stitch lines and fold lines for a ⅛ inch welt, and finally stitch and fold lines for a 1/16 inch welt. The pairs of lines 90, 92, 94 and 96 correspond, as to their spacing measured from the center line 87, with the pairs of slots 42, 38, 40 and 56 respectively of the guide and locator device comprising the plate 30. The center slot 32 of the guide and locator plate corresponds to the center line marking 87 of the binding piece 86. Thus, the two slots of the pair 42 correspond to the fold and stitch lines for a 1/16 inch welt. The pair of slots 38 corresponds to the fold and stitch lines for a ⅛ inch welt, the slots 40 correspond to the fold and stitch lines for a ¼ inch welt and finally the slots 56 correspond to the fold and stitch lines for a ½ inch welt.

By the present invention, the fold lines on the binding 86 are also constituted as lines of weakness in that the material resists bending along said lines to a lesser degree, whereby the binding may be readily folded about such lines while the remainder remains in a relatively flat shape or condition. The fold and stitch lines may be either continuous or else broken lines, the latter being indicated in FIG. 5 and the broken line construction lending itself better to the formation of lines of weakness. In some instances it is of advantage to have the stitch lines also constituted as lines of weakness, and in order to cover all possible situations of use all of the line markings in the binding 86 with the exception of the center line may be made as lines of weakness.

The guide and locator device of FIGS. 1-4 may be advantageously utilized to make the binding shown in FIG. 5, using as raw material either the relatively stiff "iron-on" Pelonite material or else other tape material. In making such a binding the user merely places the plate 30 over the binding material and marks on the latter by first passing a pencil along the center slot 32 as a guide, and then either lightly or heavily along any of the other pairs of slots, to produce the desired additional parallel pencil lines on a binding material. When the pencil is pressed down heavily, the resulting deep impression in the binding material provides a line of weakness such as is already mentioned above. Desired combinations of lines may be effected by shifting the plate 30 or turning it 180° or both, etc.

An example of the use of the binding 86 and also of the use of the guide and locator device comprising the plate 30 in making a bound buttonhole is now given, with reference to FIGS. 6-13. FIG. 6 illustrates the securement of the binding 86 to a piece of fabric 88 which is somewhat shorter and wider than the binding. The securement may be effected by machine stitching the two pieces together along the stitch lines of the desired welt size. The two pieces thus constitute a binding assemblage, as seen in FIG. 6, and a cross section of such assemblage is illustrated in FIG. 7.

In making a bound buttonhole, the guide and locator device of FIGS. 1-4 may be advantageously employed by positioning the sliders 46, 48 to bring the pins or prongs 50, 52 a distance apart which is roughly equal to the diameter of the button. The sliders are secured in such position and the locator device is then applied to the underside of the garment so that the prongs protrude and define the extent of the desired buttonhole. That is, the two prongs should be located at the extremities of the elongate buttonhole which is to be made. The binding assemblage is next prepared by folding upward and inward the side portions, along the fold lines of the tape.

The reverse stitches will be seen on the folded fabric part of the binding assemblage. The assemblage is now impaled on the prongs, as illustrated in FIG. 8. The user next marks off the length of the buttonhole (or the pocket opening, as the case may be) on both of the (reverse) stitch guide lines, using the protruding upright pins as reference points.

The assemblage of garment and binding is secured to the locator device by crossing pins 83 (FIG. 9) which are passed through the assemblage and through the openings 82, 84 of the raised cross-shaped portions 78, 80 respectively.

After the marking of the stitch lines has been completed, additional pins (or else basting) may be utilized to secure together the superposed thickness of folded binding tape and fabric (garment). The locator device is then removed after pulling out the crossing pins 83, and the assemblage thereafter machine stitched along the marked (reverse) stitch lines. All of the remainder of the pins may now be removed.

A usual procedure for finishing the bound buttonholes may now be employed, as follows: Referring to FIG. 10, after placement of the binding assemblage on the pins the opposite edge portions of the assemblage are folded inward along the fold lines. One such fold is illustrated in FIG. 10. Thereafter the stitch lines are marked.

The stitching of one folded side portion of the binding assemblage is illustrated in FIG. 10, of both portions in FIG. 11. A cut is now made along the center line of the binding assemblage, terminating in line with the ends of the machine stitching. The fabric of the garment is not at this time, cut through, but this is done in a separate operation which is performed next. In cutting through the material of the garment, a shorter center line cut is made and thereafter two angular cuts are made from each end of the straight cut, such angular cuts extending toward and terminating just short of the ends of the two lines of stitches.

Upon completion of the above cuts the free material of the binding assemblage is passed entirely through the cut, resulting in a formation similar to that shown in cross section in FIG. 12. FIG. 13 gives a plan view of the bound buttonhole as it is formed upon completion of the passing of the loose portions or flaps of the binding through the cuts. As shown in FIG. 12, the flaps are flattened against the back of the garment, and the buttonhole may then be pressed with a hot iron and the meeting edges basted temporarily as in FIG. 13.

The formation of a bound pocket opening may be effected in a manner generally similar to that outlined above in connection with bound buttonholes except where obvious minor departures are required due to the different nature of the operation.

The combination guide and locator device comprising the plate 30 and sliders 46, 48 may be utilized to facilitate other operations in connection with the sewing of fabric, garments, etc.

For example, in the operation of pleating or tucking a fabric, the sliders 46, 48 may be positioned on the plate 30 so that the distance between the two pins 50, 52 is equal to the width of an opened pleat. This is illustrated in FIG. 14. The piece of fabric 97 may then be impaled on the pins, as shown in FIG. 15, and thereafter one of the sliders may be loosened and shifted to bring the pin thereof in close juxtaposition of the pin of the other slider. This will form a pleat 99 in the material, as illustrated in FIG. 16. Thereafter, the pleat may be secured by the use of pins, basting, etc. as seen in FIG. 17. Upon completion of such securement, the locator device is removed, as the final sewing or stitching of the pleat is effected.

The procedure by which the guide and locator device is used in connection with gathering of a fabric is illustrated in FIGS. 18–20. The fabric 101 is prepared by making three rows of machine basting stitches 103 approximately 1/8 inch apart, the middle row being located at the seam line. At least three inches of thread should be left at either end for knotting. Several pins, indicated at 106, may be located in the fabric 101 to indicate quarter lengths along the same. The sliders 46, 48 are reversed on the plate 30 from the positions indicated in FIG. 1 so that the cross-shaped projections are innermost and the pins or prongs are in their remotest positions. This is illustrated in FIG. 19. The sliders are then set so that the cross-shaped projections 78, 80 are spaced apart a distance equal to the length which the seam will have after the material has been gathered. The fabric is now pinned to the cross-shaped projections (as in FIG. 9), thereby providing a fullness of the fabric in between. Each basting thread is now pulled taut from the right, working the fullness of the fabric to the left. After each thread has been pulled with uniform tension the gathered material is distributed evenly, using the quarter length pins 106 as a guide. The threads are then knotted at each end, and the fabric removed from the locator device.

In FIGS. 21–24 there is shown the use of the locator device to facilitate the applying of elastic tape to fabric. For purposes of illustration, let it be assumed that the length of the fabric seam when fully stretched is to be equal to twice the length of the unstretched seam. The sliders 46, 48 of the locator device are set on the plate 30 at a predetermined or fixed distance, as for example four inches, and tightened in place. This is seen in FIG. 21. Next, the fabric 108 is impaled on the pins so that the latter pierce the seam line, as in FIG. 22. The points of penetration are now marked by inserting common pins in the fabric at right angles to the seam. This procedure is repeated throughout the entire length of the seam. The sliders 46, 48 are now reset on the base plate 30 so that the distance between the pins 50, 52 is one-half the previous setting, or two inches. Starting with one end, place the elastic tape 110 on the reset (two-inch apart) pins, without stretching, as shown in FIG. 23. The pins should penetrate along the center portion of the tape. With the tape in place, the fabric is now placed on the pins, starting with one end of the seam, the points of penetration being those places where the straight pin markers were previously placed. These straight pin markers are now removed and reinserted through both the fabric and the elastic tape, as in FIG. 24. This procedure is repeated for the entire length of the seam. Thereafter, the assemblage of tape and fabric is removed from the locator device, and stretched and stitched on a machine.

The methods provided by the invention have been fully explained in connection with the above described procedures involving the making of bound buttonholes, bound pocket openings, and the various pleating, tucking, gathering, etc. operations explained in connection with the figures. The methods of the invention are also set forth in the appended claims.

As illustrated in FIG. 25, the locator device may also be utilized to match pieces of plaid material or striped material and the like along a seam line. In order to do this, the user selects two adjoining repeated match points of the design, on the seam line of one piece of fabric. The sliders of the locator device are then positioned to locate the pins or prongs at a distance corresponding to the distance between the said selected match points of the design. The one piece of fabric 112 is then impaled on the pins in such a manner that these latter pass through the selected match points. The second piece of fabric 114 is also impaled on the pins in a like manner, and thereafter the pieces of fabric are temporarily secured together, as with pins or basting. The entire length of the seam is done in this manner, using the locator device to match the design and each time temporarily pinning or basting the fabric along the seam line at the match points. Upon completion of this procedure, the seams will be ready for machine stitching.

It will now be understood from the foregoing that I have provided a novel and improved guide and locator device and also binding means for use in connection with fabrics, garments and the like, by which there is greatly facilitated the making of bound buttonholes, bound pocket openings, the gathering of fabric materials, the matching of plaid and striped materials and the like, and also the applying of elastic tape to fabric as well as the pleating and tucking of fabrics. The means provided herein for facilitating such operation are seen to be simple, economical to fabricate, and easily understood and used. The methods provided by the invention also greatly facilitate effecting the desired operations, and variations and modifications may be made within the scope of the claims, and portions of the improvement may be used without others.

I claim:

1. A binding assemblage for use on a garment and the like, comprising a piece of tape having spaced-apart end edges and having a plurality of parallel line markings thereon extending substantially to said end edges, said markings including a single centrally-located center-line marking and a plurality of like pairs of line markings on opposite sides of the center-line marking, said pairs constituting stitch lines and fold lines, each of said like pairs having equal spacings apart and being equi-spaced from the center-line marking, the spacings of all of the pairs at any one side of the center-line marking differing from each other and the distances thereof from the center-line marking being different; a piece of fabric disposed at one side of said piece of tape; and stitches passing through said pieces of tape and fabric along one pair of said stitch lines, permanently securing the pieces together in broadside relation to each other.

2. A binding assemblage as in claim 1 wherein the tape has a stiffness greater than that of ordinary unstarched fabric and has lines of weakness at least along the particular line-markings which constitute the fold lines, thereby to facilitate folding of the tape along the fold lines and retention of a flat shape at other locations.

3. A binding assemblage as in claim 2, wherein the tape has a heat-activated adhesive on one side whereby it can be ironed onto said piece of fabric.

4. A binding assemblage as in claim 2, wherein the tape has an adhesive coating on one side to enable it to be adhered to said piece of fabric.

5. A binding assemblage as in claim 4, wherein the tape has indicia marked on it, identifying all of the line markings, and wherein said line markings extend fully to the opposite end edges of the tape.

6. A binding assemblage as in claim 1, in combination with a portion of a garment to which the assemblage is attached, said assemblage having folds along one pair of oppositely located fold lines; and stitches securing the folded portions of the assemblage to the said portion of garment, thereby to constitute a basis for a bound opening in the garment.

References Cited by the Examiner

UNITED STATES PATENTS

| | | | |
|---|---|---|---|
| 1,064,072 | 6/13 | Harrington | 33—12 |
| 1,158,976 | 11/15 | Browning. | |
| 1,516,935 | 11/24 | Wachtel | 112—262 |
| 1,575,357 | 3/26 | Milner | 2—274 |
| 1,700,067 | 1/29 | Merriam | 2—274 |
| 2,191,321 | 2/40 | Levine | 223—28 |
| 2,644,236 | 7/53 | Pollos | 33—2 |
| 2,692,433 | 10/54 | Perna | 33—17 |
| 2,711,587 | 6/55 | Branman | 33—2 |
| 2,756,434 | 7/56 | Rick et al. | 33—12 X |
| 2,906,441 | 9/59 | Liebeskind | 223—28 |
| 2,922,167 | 1/60 | Berlin | 2—243 |
| 2,994,091 | 8/61 | Aftergood | 2—243 |
| 3,095,649 | 7/63 | Wightwick | 33—12 |

JORDAN FRANKLIN, *Primary Examiner.*